US012272881B1

(12) United States Patent
Merola et al.

(10) Patent No.: US 12,272,881 B1
(45) Date of Patent: Apr. 8, 2025

(54) PHASED ARRAY ANTENNA USING SERIES-FED SUB-ARRAYS

(71) Applicant: Amazon Technologies, Inc., Seattle, WA (US)

(72) Inventors: Christopher Steven Merola, Kirkland, WA (US); Ming-Chun Paul Lee, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/228,530

(22) Filed: Jul. 31, 2023

Related U.S. Application Data

(62) Division of application No. 16/989,754, filed on Aug. 10, 2020, now Pat. No. 11,777,209.

(51) Int. Cl.

| | |
|---|---|
| ***H01Q 3/40*** | (2006.01) |
| ***H01Q 3/26*** | (2006.01) |
| ***H01Q 3/36*** | (2006.01) |
| ***H01Q 5/35*** | (2015.01) |
| ***H01Q 21/00*** | (2006.01) |

(52) U.S. Cl.
CPC ............. *H01Q 3/40* (2013.01); *H01Q 3/2694* (2013.01); *H01Q 3/36* (2013.01); *H01Q 5/35* (2015.01); *H01Q 21/0075* (2013.01)

(58) Field of Classification Search
CPC ...... H01Q 3/26; H01Q 3/2682; H01Q 3/2694; H01Q 3/30; H01Q 3/34; H01Q 3/36; H01Q 3/40; H01Q 21/06; H01Q 21/061; H01Q 21/065; H01Q 21/0006; H01Q 21/0075; H01Q 21/0081; H01Q 5/35
See application file for complete search history.

(56) References Cited

U.S. PATENT DOCUMENTS

| | | | | | |
|---|---|---|---|---|---|
| 4,045,800 | A * | 8/1977 | Tang | H01Q 3/34 | 342/372 |
| 6,498,545 | B1 * | 12/2002 | Levi | H01Q 3/34 | 333/156 |
| 6,650,290 | B1 * | 11/2003 | Chang | H01Q 21/0006 | 455/430 |
| 10,439,851 | B2 * | 10/2019 | Novak | H01Q 3/42 | |
| 10,897,082 | B1 * | 1/2021 | Legare | H01Q 3/40 | |
| 11,245,442 | B1 * | 2/2022 | Foo | H04B 7/0617 | |
| 11,543,536 | B2 * | 1/2023 | Capet | H01Q 3/26 | |
| 11,777,209 | B1 * | 10/2023 | Merola | H01Q 21/0075 | 343/702 |
| 2005/0093737 | A1 * | 5/2005 | Schoebel | H01P 1/184 | 342/72 |
| 2005/0156802 | A1 * | 7/2005 | Livingston | H01Q 13/10 | 343/770 |
| 2006/0293013 | A1 * | 12/2006 | Gazit | H01Q 1/007 | 455/271 |
| 2007/0210959 | A1 * | 9/2007 | Herd | H01Q 3/26 | 342/368 |
| 2012/0050107 | A1 * | 3/2012 | Mortazawi | H01Q 21/0006 | 342/372 |

(Continued)

*Primary Examiner* — Seokjin Kim
(74) *Attorney, Agent, or Firm* — Lowenstein Sandler LLP

(57) ABSTRACT

Technologies directed to a hybrid-feed network of a parallel feed network and series-fed sub-arrays are described. The hybrid-feed network includes a parallel feed network and multiple groups of series-fed tiles, each tile including a beamforming integrated circuit (IC) and a set of antenna elements.

20 Claims, 10 Drawing Sheets

(56) References Cited

U.S. PATENT DOCUMENTS

| | | | | |
|---|---|---|---|---|
| 2017/0365933 | A1* | 12/2017 | Topak | H01Q 21/064 |
| 2018/0115360 | A1* | 4/2018 | Niknejad | H01Q 3/267 |
| 2018/0175514 | A1* | 6/2018 | Chou | H01Q 3/385 |
| 2019/0058530 | A1* | 2/2019 | Rainish | H04B 7/0617 |
| 2019/0089434 | A1* | 3/2019 | Rainish | H04B 7/086 |
| 2020/0212590 | A1* | 7/2020 | Rofougaran | H01Q 19/062 |
| 2021/0135355 | A1* | 5/2021 | Diebold | H01Q 3/36 |
| 2021/0159594 | A1* | 5/2021 | Tiebout | H01Q 5/385 |
| 2021/0296783 | A1* | 9/2021 | Rostomyan | H01Q 1/2283 |
| 2022/0131274 | A1* | 4/2022 | Min | H01Q 3/30 |
| 2022/0407225 | A1* | 12/2022 | Kohtani | H01Q 3/2617 |
| 2023/0087065 | A1* | 3/2023 | Sikri | H04B 7/0617 |

* cited by examiner

PHASED ARRAY ANTENNA USING SERIES-FED SUB-ARRAYS

RELATED APPLICATION

This application is a divisional application of U.S. patent application Ser. No. 16/989,754, filed Aug. 10, 2020, the entire contents of which are hereby incorporated by reference herein.

BACKGROUND

A large and growing population of users is enjoying entertainment through the consumption of digital media items, such as music, movies, images, electronic books, and so on. The users employ various electronic devices to consume such media items. Among these electronic devices (referred to herein as endpoint devices, user devices, clients, client devices, or user equipment) are electronic book readers, cellular telephones, Personal Digital Assistants (PDAs), portable media players, tablet computers, netbooks, laptops, and the like. These electronic devices wirelessly communicate with a communications infrastructure to enable the consumption of the digital media items. In order to communicate with other devices wirelessly, these electronic devices include one or more antennas.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1:
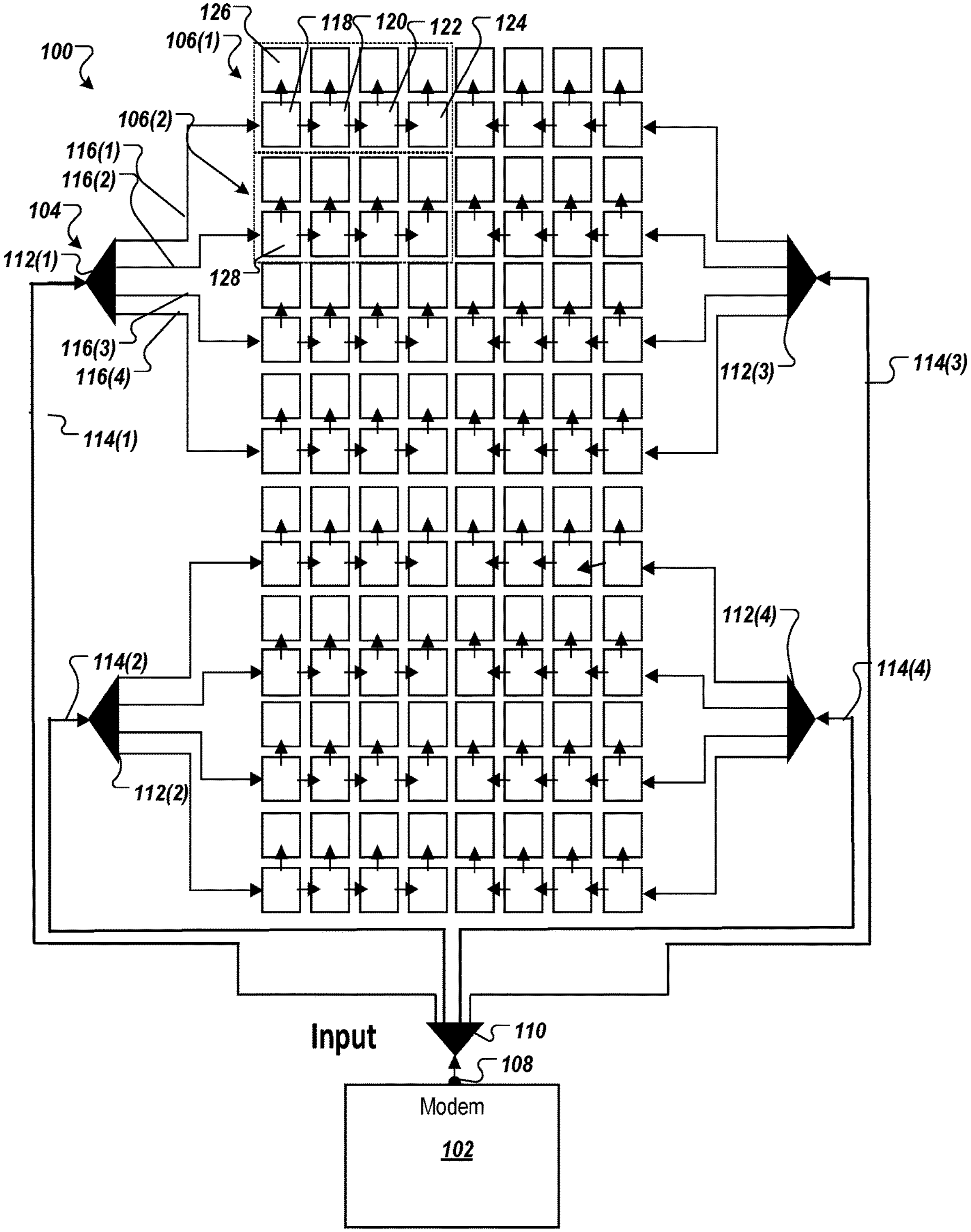
FIG. 1 is a block diagram of a modem, a parallel feed network, and multiple tile groups of tiles of a panel of a communication system where each group of tiles includes a set of tiles that are coupled in series according to one embodiment.

Technologies directed to a hybrid-feed network of a parallel feed network and series-fed sub-arrays are described. An array antenna, such as a phased array antenna, can include hundreds or thousands of antenna elements. Described herein are arrangements for a feed network for antenna modules for applications in large array antennas, such as a phased array antenna. The array antenna can be made up of multiple tiles, which are also referred to herein as antenna modules or simply modules. Each tile can include beamforming integrated circuit (IC) and a subset of antenna elements with the subset containing one to tens of antenna elements. The tiles can be considered as a unit cell that can be individually manufactured as identical parts and disposed on a circuit board or other support structure to make up a panel. The collection of antenna elements is part of an array antenna, such as a phased array antenna. The subset of antenna elements can be referred to as an antenna module or a module and the beamforming IC and the subset of antenna elements can be referred to as the tile. The large array antenna can be made up of an array of tiles that are attached to another substrate, such as a PWB, for interconnection with a modem. Each tiles thus incorporates an integer number of antenna elements. The tiles are often very closely spaced between each other, preventing the insertion of any other component between them. It can be challenging feeding multiple tiles.

A conventional array antenna can feed multiple antenna elements using a corporate feed network. A corporate feed network is a binary feed network in which a single feed is split into multiple branches, and each branch can be further split into smaller sub-branches until there are enough branches for the antenna elements. That is, each antenna element is coupled to one of the sub-branches. The corporate feed network is considered a parallel feed network since parallel lines connect each of the antenna elements to a single feed port. For example, an 8-element array would include seven power splitters to achieve the corporate feed network. The paths from the single feed to each of the antenna elements need to be matched so that a signal arrives at the antenna element at approximately the same time. Also, as the number of antenna elements increases so does the number of power splitters to implement the corporate feed network.

Another type of feed network is a series feed in which a first antenna element is coupled to a feed and that feed is connected to a second antenna element in series, forming a series of antenna elements that are fed at one side of the series. A conventional array antenna includes antenna elements and operates to form beams (e.g., of electromagnetic radiation) and steer the beams by relying on constructive and destructive interference of electromagnetic waves transmitted by each individual antenna element. In the series feed network, there may be a delay between when the first antenna element receives the signal and when a last antenna element receives the signal. This delay may be acceptable when steering the beam in one direction, but can be problematic when not steering the beam or steering the beam in the opposite direction. Also, when the beam is formed by the conventional array antenna with antenna elements arranged with antenna elements feed in series, the beam can have grating lobes, which are undesirable for performance. To form a beam the conventional array antenna requires either a large number of power splitters in a corporate feed structure are needed or performance of the array can be impacted by the delays when a series feed network is used.

Aspects of the present disclosure overcome the deficiencies of conventional array antennas by providing a hybrid feed structure that includes a parallel network feed and series-fed tiles in groups of tiles as described herein. Using the hybrid feed structure, the number of power splitters can be reduced. Reducing the number of power splitters for a panel reduces complexity, cost, mass, and power consumption (or power requirements) of the array antenna. Aspects of the present disclosure can use tiles that are identical to facilitate manufacturing, assembly, and part management. The array antenna is constructed using the groups of tiles. The tiles can be made up of a beamforming IC and a set of antenna elements disposed on a circuit board, such as an antenna module. The antenna modules can be manufactured from a ceramic-based material, a Teflon-based material, organic materials, or the like. The antenna elements can be printed on the modules (e.g., using copper). The antenna elements should be printed on the antenna modules in such a way to minimize the space between an edge of the antenna module and one of the antenna elements near the edge. In this way, the antenna elements can be spaced closer together when the antenna modules are assembled together, and the grading lobes can be minimized.

FIG. 1 is a block diagram of a modem 102, a parallel feed network 104, and multiple tile groups of tiles 106 of a panel 100 of a communication system where each group of tiles includes a set of tiles that are coupled in series according to one embodiment. The panel 100 include a feed port 108 coupled to the modem 102. The feed port 108 can be a feed input when in a transmit (TX) mode and a feed output when in a receive (RX) mode. The parallel feed network 104 includes a power splitter 110 coupled to the feed port 108 and a set of four power splitters 112, each coupled to the power splitter 110 via an equal-length line 114. In some cases, the lines can be considered line segments between components. The each of the multiple groups of tiles 106 is coupled to a respective power splitter 112 via an equi-length line 116. Equi-length lines are lines that have the same effective electrical length. In some cases, the lines are physically equal in length. In other cases, the lines may be physical different lengths, but have the same effective electrical length. It should be noted that the equi-length lines 116(*x*) are not illustrated as being the same physical length, but have the same effective electrical length. Each of the equi-length lines 116(*x*) are coupled in parallel. A first group of tiles 106(1) includes a first tile 118 that includes a first beamforming IC and a first set of antenna elements (not illustrated in FIG. 1). The first beamforming IC includes an input terminal coupled to a first power splitter 112(1) via a first equi-length line 116(1). It should also be noted that each of the first set of antenna elements is coupled to the first beamforming IC via an equi-length line (not illustrated in FIG. 1). The first group of tiles 106(1) also includes a second tile 120 with a second beamforming IC having an input terminal coupled to a first output terminal of the first beamforming IC. The first group of tiles 106(1) also includes a third tile 122 with a third beamforming IC having an input terminal coupled to a first output terminal of the second beamforming IC. The first group of tiles 106(1) also includes a fourth tile 124 with a fourth beamforming IC having an input coupled to a first output terminal of the third beamforming IC. The first tile 118, the second tile 120, the third tile 122, and the fourth tile 124 are coupled in series. The equi-length lines 116(1)-(4) are parallel lines that each coupled to a set of tiles that are coupled in series and considered to be series-fed tiles. In some embodiments, the first tile 118, the second tile 120, the third tile 122, and the fourth tile 124 are identical tiles. As described herein, an identical tile is a tile that can be manufactured with the same number of antenna elements and the same type of beamforming IC. That is, the number of antenna elements and the relative placement of the antenna elements can be the same.

In a further embodiment, the first group of tiles 106(1) further includes: a fifth tile 126 with a fifth beamforming IC having an input terminal coupled to a second output terminal of the first beamforming IC; a sixth tile with a sixth beamforming IC having an input terminal coupled to a second output terminal of the second beamforming IC; a seventh tile with a seventh beamforming IC having an input terminal coupled to a second output terminal of the third beamforming IC; and an eighth tile comprising an eighth beamforming IC having an input terminal coupled to a second output terminal of the fourth beamforming IC. The fifth tile 126 can be considered to be a series-fed tile with respect to the first tile 118. The sixth tile, however, is a series-fed tile with respect to the second tile 120.

As illustrated in FIG. 1, each of the groups of tiles 106 are identical or an inverted version of the first group of tiles 106(1). For example, the second group of tiles 106(2) also includes a first tile 128 that is coupled to the first power splitter 112(1) via an equi-length line 116(2). The lines are equi-length so that the signal from the first power splitter 112(1) arrives at the respective first tiles of each group at the same time. The first power splitter 112(1) and four groups of tiles can be repeated in an identical fashion to add additional tiles, such as illustrated in FIG. 1 with the four groups of tiles that are coupled to a second power splitter 112(2). Also, the arrangement of the first power splitter 112(1) and the four groups of tiles can be repeated in an inverted fashion to add additional tiles, such as illustrated in FIG. 1 with the four groups of tiles that are coupled to a third power splitter 112(3). Similarly, the second power splitter 112(2) with the four groups of tiles can be repeated in an inverted fashion to add additional tiles, such as illustrated in FIG. 1 with the four groups of tiles that are coupled to a fourth power splitter 112(4). Each of the four power splitters 112 are 1-to-4 power splitters that coupled to the power splitter 110. It should be noted that the power splitter 110 is illustrated as a 1-to-2 power splitter, it is a 1-to-4 power splitter with four output lines, each coupled to one of the four power splitters 112.

In FIG. 1, the parallel feed network 104 includes i) one input terminal coupled to the feed port and ii) sixteen output terminals, each being coupled to a single tile of a group of tiles in which at least some of the tiles of the group are coupled in series. In another embodiments, other types of parallel feed networks can be used to connect to a first tile in each of the multiple groups of the panel 100. For example, a 1-to-16 power splitter can be used to connect the feed port 108 to each of the first tiles in the respective group of tiles. The groups of tiles then are considered to be series-fed groups of tiles after the parallel network. As such, the feed structure includes a portion that is considered a parallel feed network (or corporate network) and another portion that is considered to be a series feed network. Although the panel 100 is illustrated as sixteen groups of tiles and four power splitters, alternatively, the panel can include other numbers of tiles and other numbers of power splitters. However, because the groups of tiles have at least some series-fed tiles, the number of power splitters are reduced from a feed structure that only includes a corporate fee network of power splitters.

In one embodiment, each tile of the groups of tiles 106 is represented as a block, which represents a beamforming IC (also referred to as beamforming module) that drives a set of elements. For example, the set of antenna elements in each tile can be a 3×2 element subarray. This pattern can be repeated to form an antenna array with a grid or lattice pattern of antenna elements for the array antenna, such as a phased array antenna. The 3×2 element subarray can be arranged to be square shaped where the aspect ratio of the tile (unit cell) can be taken into account. In another embodiments, the tiles can be other shapes such as rectangles.

Figure 2:
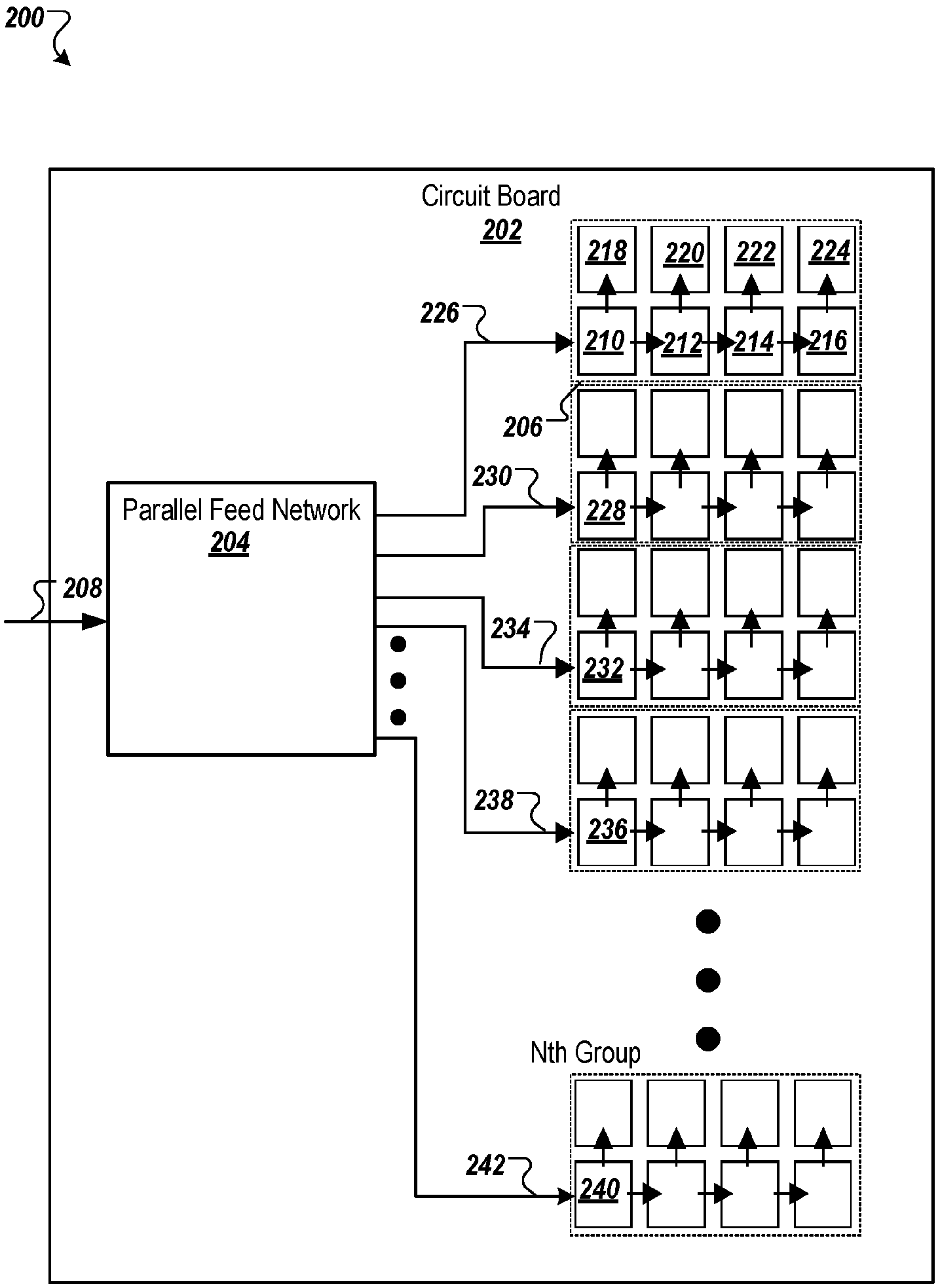
FIG. 2 is a block diagram of a panel of an array antenna, including a circuit board with a parallel feed network coupled to multiple groups of tiles where each group includes a set of tiles that are coupled in series according to one embodiment.

FIG. 2 is a block diagram of a panel 200 of an array antenna, including a circuit board 202 with a parallel feed network 204 coupled to multiple groups of tiles 206 where each group includes a set of tiles that are coupled in series according to one embodiment. The circuit board 202 includes a feed port 208 coupled to the parallel feed network 204. The parallel feed network 204 is coupled to a series-fed set of tiles, including a first tile 210, a second tile 212, a third tile 214, a fourth tile 216, a fifth tile 218, a sixth tile 220, a seventh tile 222, and an eighth tile 224. The first tile 210 includes a first beamforming IC and a first set of antenna elements, each being coupled to the first beamforming IC. An input terminal of the first beamforming IC is coupled to a first line 226 of the parallel feed network 204. The second tile 212 includes a second beamforming IC having an input terminal coupled to a first output terminal of the first beamforming IC. The third tile 214 includes a third beamforming IC having an input terminal coupled to a first output terminal of the second beamforming IC. The fourth tile 216 includes a fourth beamforming IC having an input terminal coupled to a first output terminal of the third beamforming IC. The first tile 210, the second tile 212, the third tile 214, and the fourth tile 216 are coupled in series. The fifth tile 218 includes a fifth beamforming IC having an input terminal coupled to a second output terminal of the first beamforming IC of the first tile 210. The sixth tile 220 includes a sixth beamforming IC having an input terminal coupled to a second output terminal of the second beamforming IC of the second tile 212. The seventh tile 222 includes a seventh beamforming IC having an input terminal coupled to a second output terminal of the third beamforming IC of the third tile 214. The eighth tile 224 includes an eighth second beamforming IC having an input terminal coupled to a second output terminal of the fourth beamforming IC of the fourth tile 216. Although the second tile 212 and the fifth tile 218 can be considered to be feed in parallel with respect to one another, the second tile 212 is coupled in series with respect to the first tile 210 and the fifth tile 218 is coupled in series with respect to the first tile 210. Similarly, the sixth tile 220 and the third tile 214 are in parallel, with respect to the second tile 212 each of the sixth tile 220 and the third tile 214 is coupled in series.

The eight tiles 210-224 can be considered part of a first group and the panel 200 can include multiple identical groups. The groups can be identical in the number of tiles, in the relative placement of tiles, or any combination thereof. In some cases, the groups are identical in number and inverted in relative placement. A second group can include a first tile 228 that is coupled to a second line 230 of the parallel feed network 204. A third group can include a first tile 232 that is coupled to a third line 234 of the parallel feed network 204. A fourth group can include a first tile 236 that is coupled to a fourth line 238 of the parallel feed network 204. There can be N number of groups, including an Nth group with a first tile 240 that is coupled to an Nth line 242 of the parallel feed network 204.

In another embodiment, the groups of tiles can be coupled together in series in other configurations. For example, the fifth tile 218 can be coupled to the first line 226 of the parallel feed network 204 and the sixth tile 220, the seventh tile 222, and the eighth tile 224 are coupled in series and the first tile 210 is coupled in series with the fifth tile 218, the second tile 212 is coupled in series with the sixth tile 220, the third tile 214 is coupled in series with the seventh tile 222, and the fourth tile 216 is coupled in series with the eighth tile 224. In another embodiment, the first tile 210, the second tile 212, the third tile 214, and the fourth tile 216 are coupled in series and the eighth tile 224 is coupled in series with the fourth tile 216, the seventh tile 222 is coupled in series with the eighth tile 224, the sixth tile 220 is coupled in series with the seventh tile 222, and the fifth tile 218 is coupled in series with the sixth tile 220. In another embodiment, the first tile 210, the second tile 212, the third tile 214, and the fourth tile 216 are coupled in series, the fifth tile 218 is coupled in series with the first tile 210, the sixth tile 220 is coupled in series with the second tile 212, the sixth tile 220 is coupled in series with the third tile 214, and the eighth tile 224 is coupled in series with the seventh tile 222, instead of the fourth tile 216. Alternatively, other series connections can be made between different ones of the tiles of the group.

In another embodiment, the panel 200 can include an inverted version that is located adjacent to the N groups illustrated in FIG. 2.

In one embodiment, the parallel feed network 204 includes a power splitter coupled to the feed port 208 and a set of M number of power splitters, each coupled to the power splitter via an equi-length line. Alternatively, the parallel feed network 204 can include any number of power splitters that provide the same number of lines as there are number of groups of tiles, such as illustrated in FIG. 3.

Figure 3:
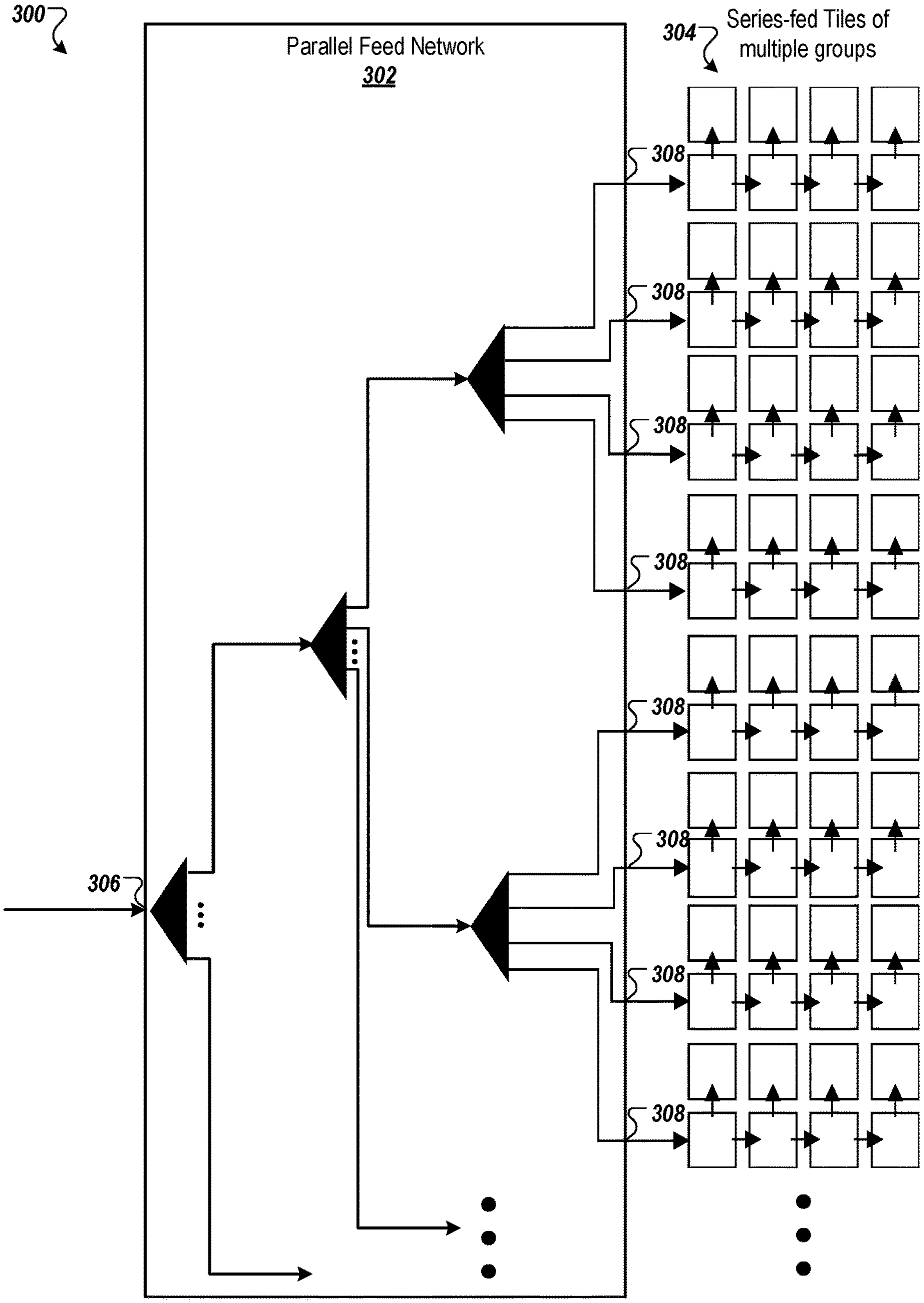
FIG. 3 is a block diagram of a parallel feed network coupled to multiple groups of series-fed tiles of a panel according to one embodiment.

FIG. 3 is a block diagram of a parallel feed network 302 coupled to multiple groups of series-fed tiles 304 of a panel 300 according to one embodiment. The parallel feed network 302 includes a feed port 306 coupled to a modem (not illustrated) and multiple outputs 308 coupled to each group of the multiple groups of series-fed tiles 304. The parallel feed network 302 can include any number of levels of power splitters to split a signal at the feed port 306 to a specific number of outputs 308, each output 308 being coupled to a first tile of each of the multiple groups of series-fed tiles 304. The parallel feed network 302 illustrates three levels of power splitters. In other embodiments, such as with sixteen groups only two levels of 1-to-4 power splitters are needed. Similarly, for more than sixteen groups, additional levels of power splitters may be needed. Also, if other splits, such as 1-to-8, 1-to-16, or the like can be used to split the signal at the feed port 306 to the number of outputs 308. The parallel feed network 302 can be considered a corporate feed network. Each should be noted that the parallel feed network 302 can include signal paths that are equi-distant (or equi-length) between the feed port 306 and a terminal of each of the first tiles of each of the groups. For example, each output 308 can be an equi-length line between a last level of power splitters and an input terminal of the first tile of each of the groups of tiles. It should also be noted that the lines between the beamforming IC and each of the antenna elements can be equal in length for matched phased delay within the tile. Also, the lengths between each of the first title, the second tile, the third tile, and the fourth tile can be equal between each of the groups so they can have similar timing in each of the groups of tiles. It should also be noted that the multiple groups of series-fed tiles 304 can be replicated and mirrored to add additional tiles to the panel, such as illustrated in FIG. 4.

Figure 4:
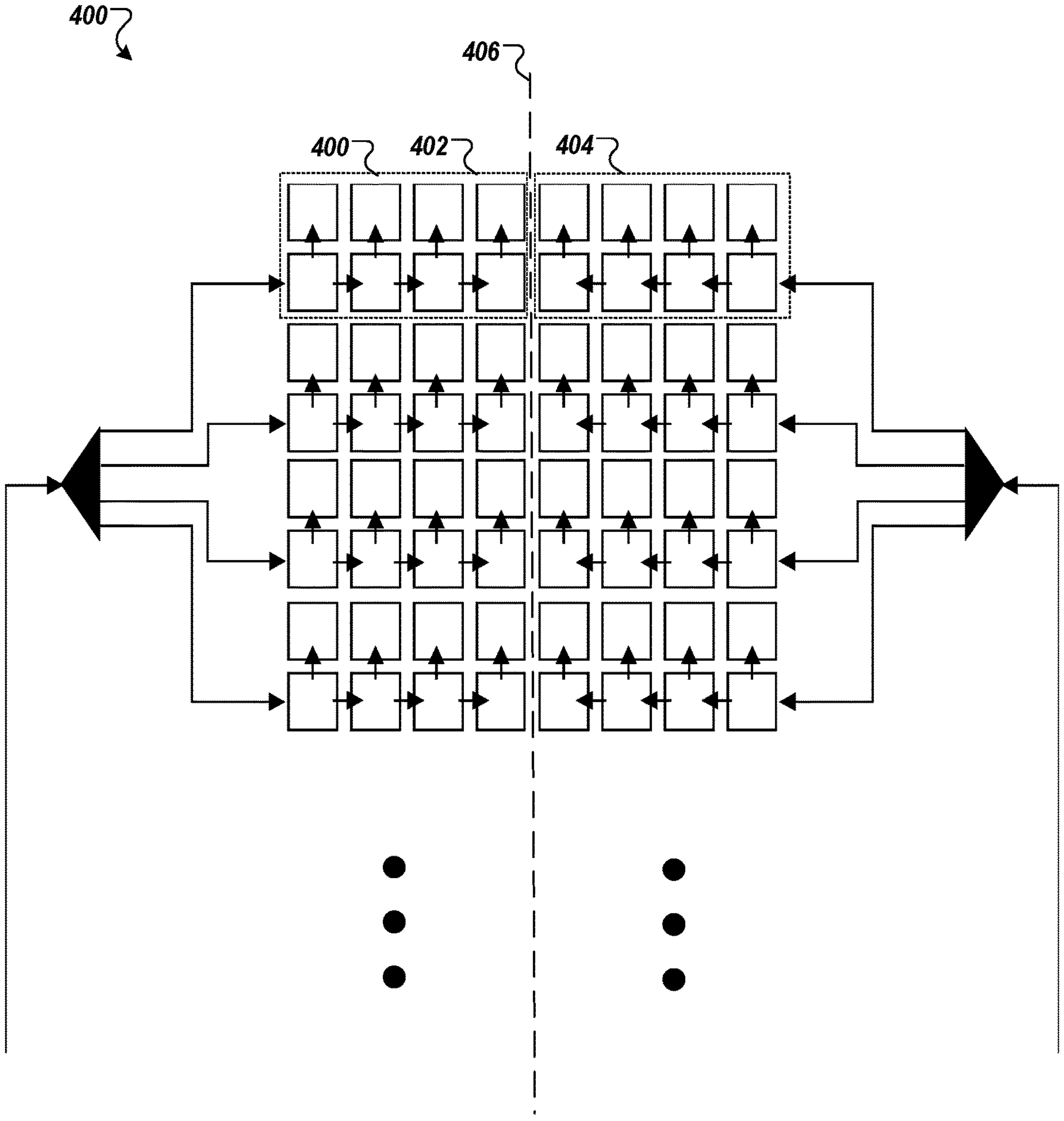
FIG. 4 is a block diagram of a panel with symmetrical groups of tiles according to one embodiment.

FIG. 4 is a block diagram of a panel 400 with symmetrical groups of tiles according to one embodiment. The panel 400 includes multiple groups, including a first group 402 of tiles and a second group 404 of tiles. The second group 404 is similar to the first group 402, but the second group 404 is mirrored about an axis 406 so that the first group 402 and the second group 404 are symmetrical about the axis 406. The panel 400 can include more symmetrical groups as illustrated. It should be noted at the groups can be located and oriented in other directions than those illustrated in FIGS. 1-4. For example, the panel 400 can be rotated 90 degrees and feed on top and bottom sides of the panel 400. The tiles within the groups can be coupled together in different configurations, but the tiles within the tile need to be coupled in series.

The following describes additional details within each of the groups described above with respect to FIGS. 1-4.

Figure 5A:
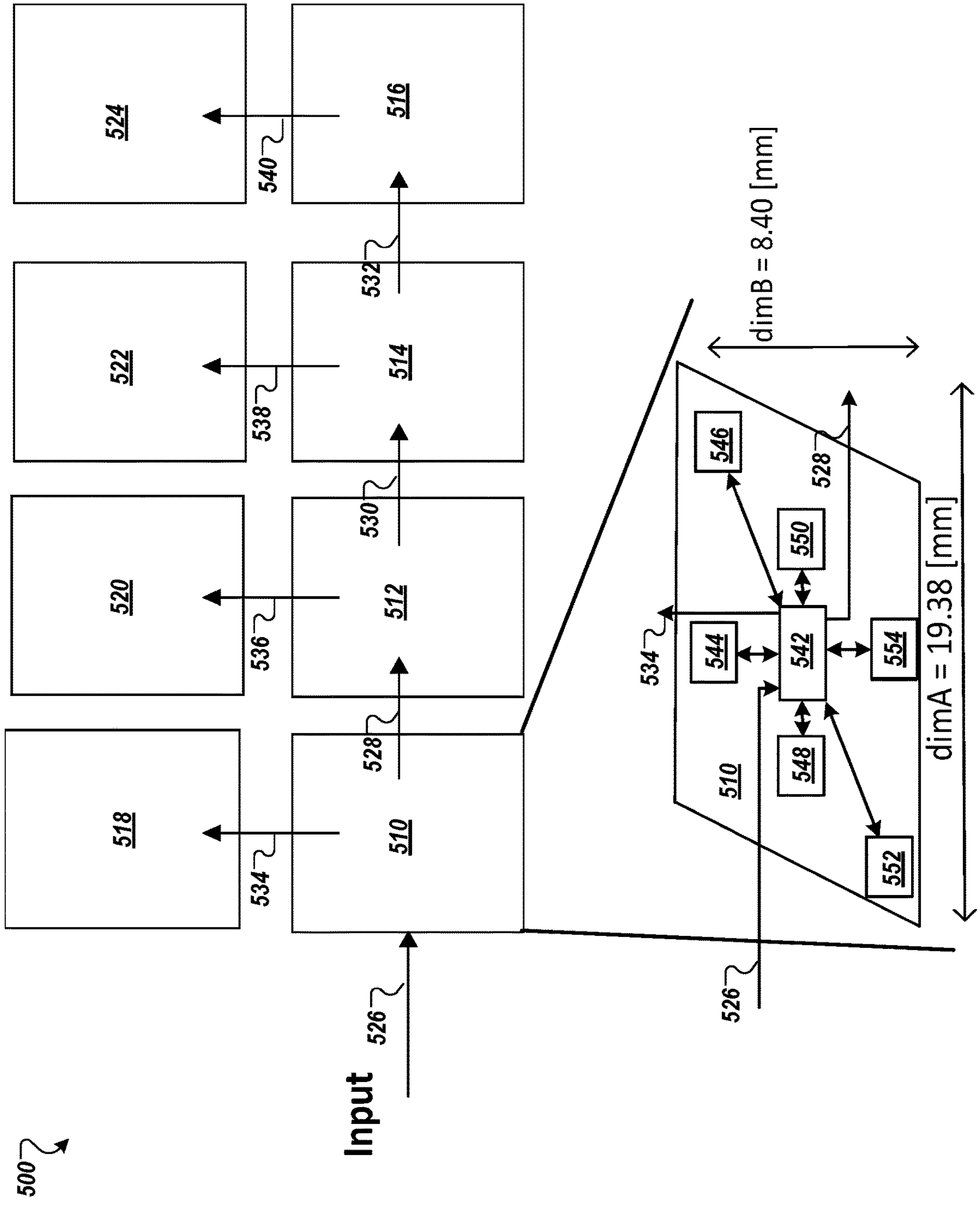
FIG. 5A is a block diagram of a group of tiles that includes a first set of tiles that are coupled in series according to one embodiment.

FIG. 5A is a block diagram of a group of tiles 500 that includes a set of tiles that are coupled in series according to one embodiment. The set of tiles includes a first tile 510, a second tile 512, a third tile 514, a fourth tile 516, a fifth tile 518, a sixth tile 520, a seventh tile 522, and an eighth tile 524. A feed port 526 is coupled to the first tile 510. The feed port 526 can be one of multiple parallel lines of a parallel feed network, as described herein. The first tile 210 includes a first beamforming IC 542 and a first set of antenna elements, each being coupled to the first beamforming IC 542. The second tile 512, the third tile 514, and the fourth tile 516 are coupled in series with the first tile 510. That is, the second tile 512 is coupled to the first tile via a second line 528, the third tile 514 is coupled to the second tile 512 via a third line 530, and the fourth tile 516 is coupled to the third tile 514 via a fourth line 532. The fifth tile 518 is coupled to the first tile 510 via a fifth line 534, the sixth tile 520 is coupled to the second tile 512 via a sixth line 536, the seventh tile 522 is coupled to the third tile 514 via a seventh line 538, and the eighth tile 524 is coupled to the fourth tile 516 via an eighth line 540.

As illustrated in the expanded view of the first tile 510, the first beamforming IC 542 is coupled to six antenna elements 544-554. An input terminal 556 of the first beamforming IC 542 is coupled to the feed port 526 (e.g., first line 226 of the parallel feed network 204), as illustrated in a power splitter network 558 of a first beamforming IC 542 of FIG. 5B.

Figure 5B:
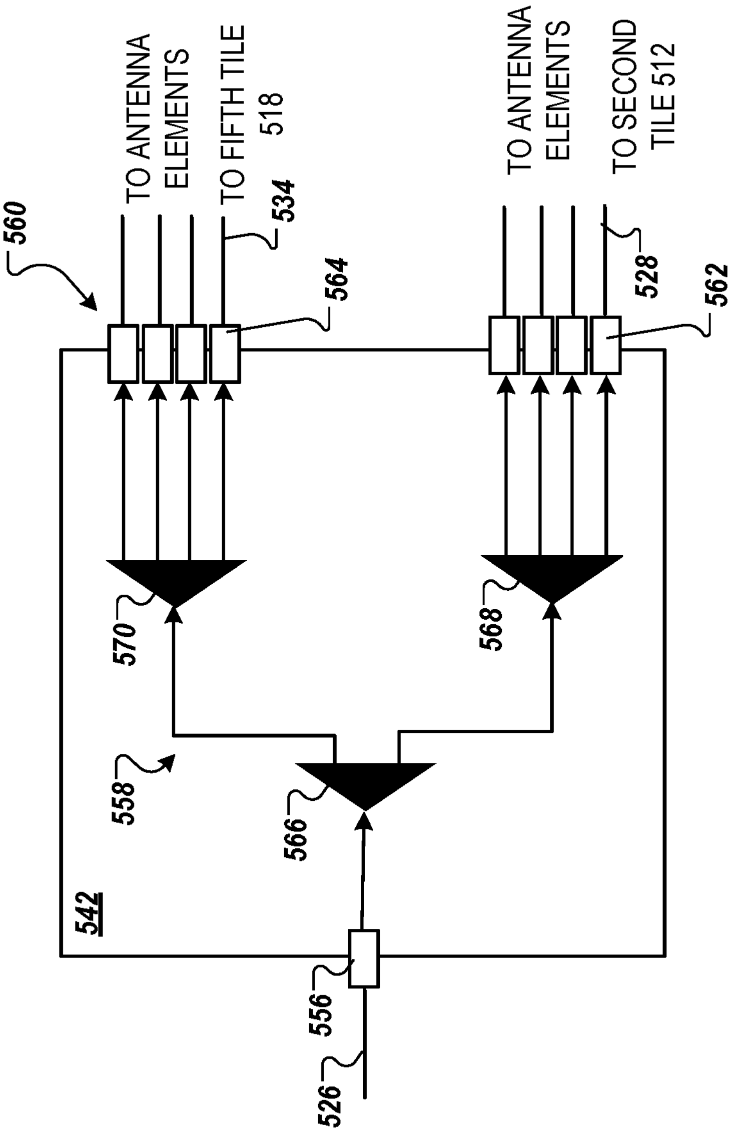
FIG. 5B is a block diagram of a power splitter network within a beamforming IC according to one embodiment.

FIG. 5B is a block diagram of a power splitter network 558 within the first beamforming IC 542 of FIG. 5A according to one embodiment. The power splitter network 558 includes one or more power splitters to split an RF signal at the input terminal 556 onto output terminals 560. Continuing with the example shown in FIG. 5A, there are six antenna elements 544-554 on the first tile 510 and the power splitter network 558 is a 1-to-8 power splitter. These six antenna elements 544-554 are coupled to six output terminals 560, leaving two additional output terminals that can be used to couple to adjacent tiles. The input terminal 556 and the output terminals 560 can be RF ports of the first beamforming IC 542. Each of the RF ports is coupled to one of the antenna elements or a terminal of another beamforming circuit of another tile as described herein. As illustrated in FIG. 5A, a first output terminal 562 is coupled to the second line 528 between the first tile 510 to the second tile 512 and a second output terminal 564 is coupled to the fifth line 534 coupled between the first tile 510 and the fifth tile 518.

It should be noted that the other tiles 512-524 each include a beamforming IC having an input terminal coupled to an output terminal of another beamforming IC of another tile and multiple antenna elements coupled to the respective beamforming IC in a similar manner as described and illustrated with respect to FIGS. 5A-5B.

The eight tiles 510-524 can be considered part of a first group of a panel and the group can be replicated and placed in various configurations with the first group as described herein.

As illustrated in FIG. 5B, the power splitter network 558 includes a first power splitter 566 coupled to the input terminal 556, a second power splitter 568 that coupled to the first power splitter 566, and a third power splitter 570 that is coupled to the first power splitter 566. The second power splitter 568 is coupled to three of the six antenna elements and the first output terminal 562 and the third power splitter 570 is coupled to the other three of the six antenna elements and the second output terminal 564. Alternatively, the first output terminal 562 and the second output terminal 564 can be coupled to the same power splitter. Alternatively, other configurations of power splitting networks are possible.

Referring back to FIG. 5A, the set of antenna elements of the first tile 510 are illustrated as three rows of two antenna elements per each row (3×2). The first tile 510 can be an antenna module with the 3×2 pattern and the beamforming IC. The other tiles can be identical tiles as the first tile 510. In some cases, the lines that connect each of the antenna elements of the tile to the beamforming IC are equal in length (i.e., equi-length lines).

Also, as illustrated in FIG. 5A, the first tile 510, the second tile 512, the third tile 514, and the fourth tile 516 are located along a first axis of a panel. The fifth tile 518, the sixth tile 520, the seventh tile 522, and the eighth tile 524 that are located along a second axis of the panel that is parallel to the first axis. Alternatively, the tiles can be located in other configurations and coupled together in other configurations as described herein. As noted above, the tiles 510-524 are part of a first group of tiles. Additional groups of tiles can be used in connection with the first group, such as a second group, a third group, and a fourth group of tiles can be used to form a section of the panel, such as illustrated in a first section of the sixteen groups of tiles in FIG. 1. In some cases, the first tile 510, the second tile 512, the third tile 514, and the fourth tile 516, which are located along the first axis, are symmetric about a center axis with respect to four additional tiles that are located along the first axis on another side of the center axis, the center axis being perpendicular to the first axis. Similarly, the fifth tile 518, the sixth tile 520, the seventh tile 522, and the eighth tile 524, which are located along the second axis, are symmetric about the center axis with respect to four additional tiles that are located on the second axis on another side of the center axis.

Figure 6:
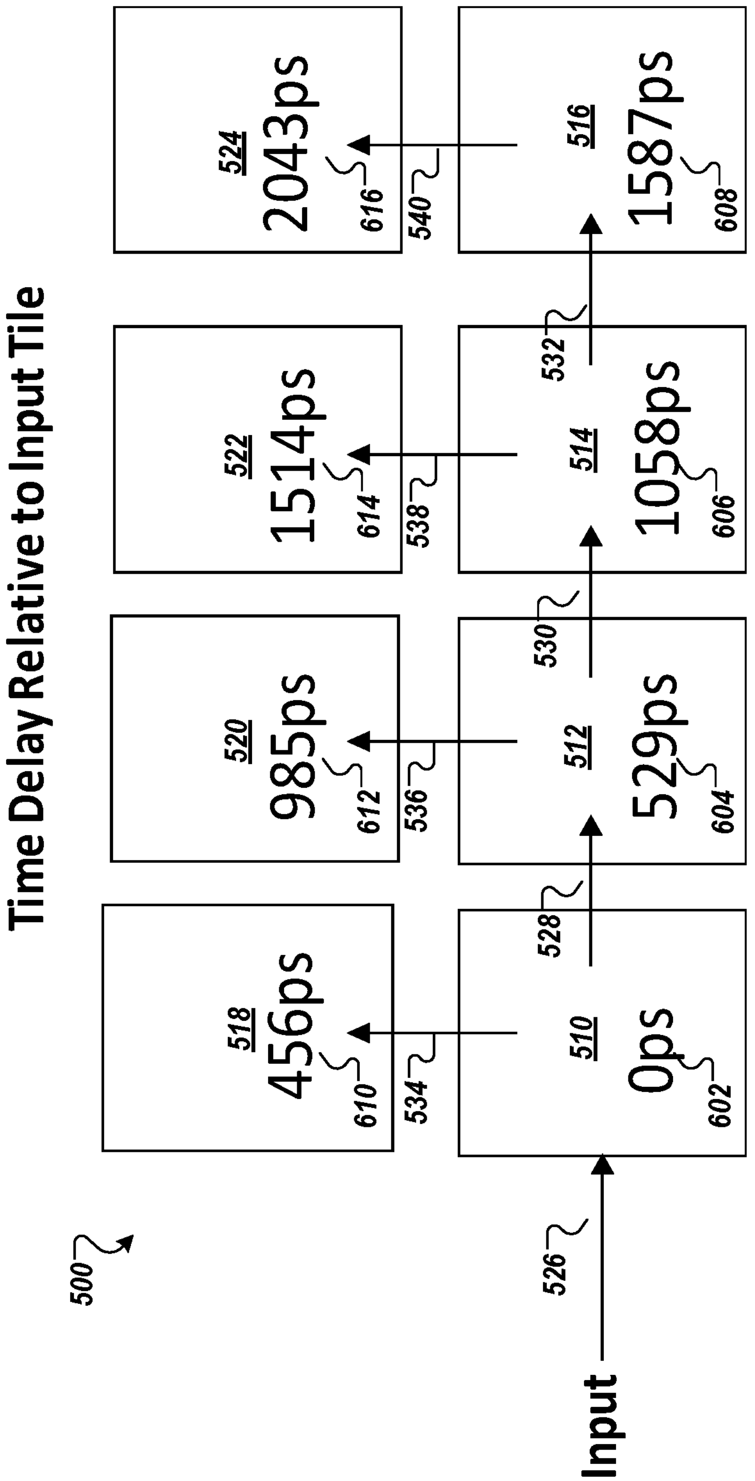
FIG. 6 illustrates a time delay relative to an input tile for the group of tiles of FIG. 5A according to one embodiment.

FIG. 6 illustrates a time delay relative to an input tile for the group of tiles of FIG. 5A according to one embodiment. At the first tile 510, there is no time delay 602 (e.g., Ops). There is a first time delay 604 for a signal to reach the second tile 512 via the first tile 510. The first time delay 604 can be made up of a fixed time delay for the signal to propagate through the first beamforming IC 542 and a propagation delay over the second line 528. The second line 528 is a series feed trace between the first tile 510 and the second tile 512. Given the example dimensions illustrated in FIG. 5A, the first time delay 604 can include 400 picoseconds (ps) for the fixed time delay for the signal to propagate through the first beamforming IC 542 and 129 ps for the series feed trace, totaling 529 ps for the first time delay 604. The propagation delay of the series feed trace can be estimated as 1.1 times the unit cell (UC) length of the first tile 510. The extra 10% is for routing around other components. Assuming the first dimensions (dimA) is 19.38 mm, the second dimension (dimB) is 8.40 mm, and a dielectric constant of 3.3 (e.g., dk=3.3), the propagation delay for the second line 528 is 129 ps. There is a second time delay 606 for the signal to reach the third tile 514 via the first tile 510 and the second tile 512. The second time delay 606 can be made up of a fixed time delay for the signal to propagate through a second beamforming IC (e.g., 400) and a propagation delay over the third line 530 (e.g., 129 ps). The second time delay 606 can be 1058 ps. There is a third time delay 608 for the signal to reach the fourth tile 516 via the first tile 510, the second tile 512, and the third tile 514. The third time delay 608 can be made up of a fixed time delay for the signal to propagate through a third beamforming IC (e.g., 400) and a propagation delay over the fourth line 532 (e.g., 129 ps). The third time delay 608 can be 1587 ps.

Similarly, a propagation delay of the series feed trace between the first tile 510 and the fifth tile 518 can be estimated to be 56 ps for these particular dimensions. There is a fourth time delay 610 for the signal to reach the fifth tile 518 via the first tile 510. The fourth time delay 610 can be made up of a fixed time delay for the signal to propagate through a fifth beamforming IC (e.g., 400) and a propagation delay over the fifth line 534 (e.g., 56 ps). The fourth time delay 610 can be 456 ps. There is a fifth time delay 612 for the signal to reach the sixth tile 520 via the first tile 510 and the second tile 512. The fifth time delay 612 can be made up of a fixed time delay for the signal to propagate through a sixth beamforming IC (e.g., 400) and a propagation delay over the sixth line 536 (e.g., 56 ps). The fifth time delay 612 can be 985 ps. There is a sixth time delay 614 for the signal to reach the seventh tile 522 via the first tile 510, the second tile 512, and the third tile 514. The sixth time delay 614 can be made up of a fixed time delay for the signal to propagate through a seventh beamforming IC (e.g., 400) and a propagation delay over the seventh line 538 (e.g., 56 ps). The sixth time delay 614 can be 1514 ps. There is a seventh time delay 616 for the signal to reach the eighth tile 524 via the first tile 510, the second tile 512, the third tile 514, and the fourth tile 516. The seventh time delay 616 can be made up of a fixed time delay for the signal to propagate through an eighth beamforming IC (e.g., 400) and a propagation delay over the eighth line 540 (e.g., 56 ps). The seventh time delay 616 can be 2043 ps.

Figure 7:
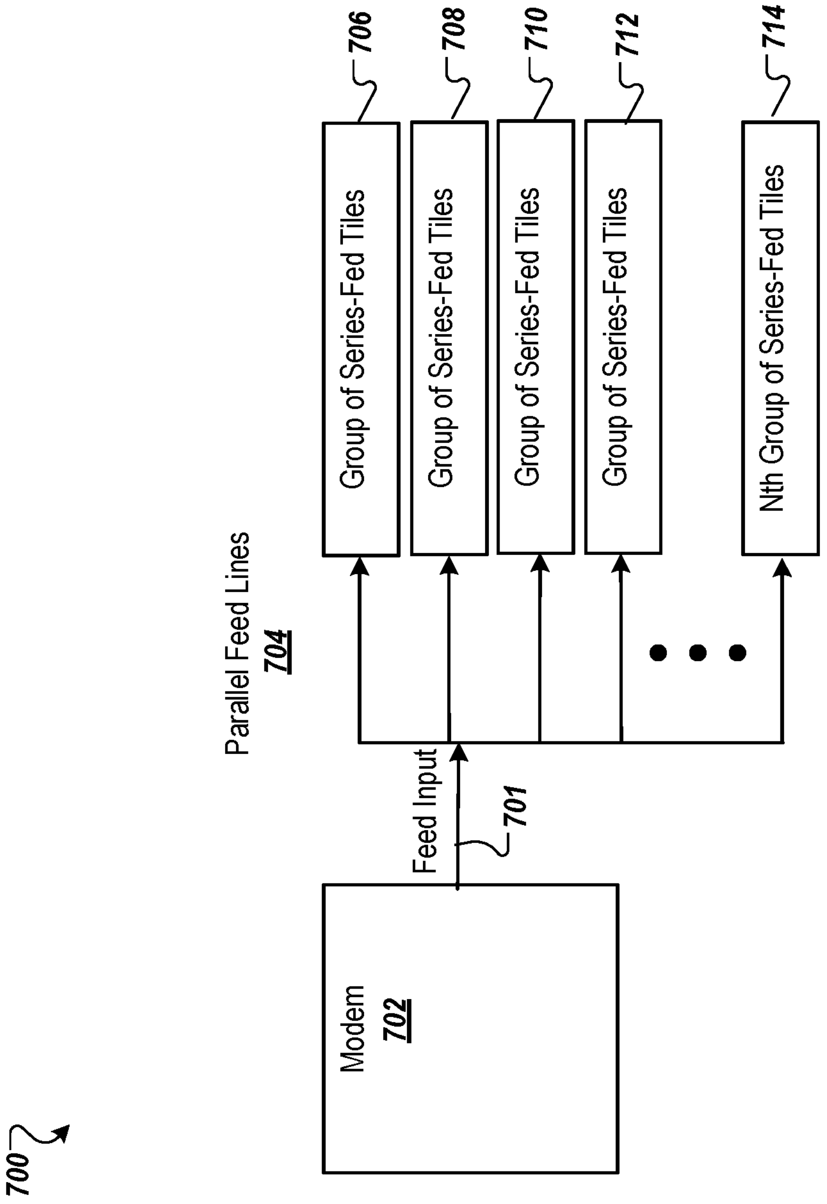
FIG. 7 is a block diagram of a communication system with parallel feed lines and multiple groups of series-fed tiles according to one embodiment.

FIG. 7 is a block diagram of a communication system 700 with parallel feed lines and multiple groups of series-fed tiles according to one embodiment. In this embodiment, the communication system 700 includes a modem 702 coupled to a feed port 701. The feed port 701 is coupled to N number of parallel feed lines 704, where N corresponds to a number of groups of series-fed tiles. In the illustrated embodiment, there is a first group of series-fed tiles 706, a second group of series-fed tiles 708, a third group of series-fed tiles 710, a fourth group of series-fed tiles 712, and an Nth group of series-fed tiles 714. Alternatively, other numbers of groups of series-fed tiles can be used. Each of the groups of series-fed tiles is coupled to one of the parallel feed lines 704. The first group of series-fed tiles 706 includes a first tile that is coupled to a first line of the parallel feed lines 704. The first group of series-fed tiles 706 also includes at least two additional tiles that are coupled in series with the first tile of the first group. The second group of series-fed tiles 708 includes a first tile coupled to a second line of the parallel feed lines. The second group of series-fed tiles 708 also includes at least two tiles are coupled in series with the first tile of the second group. The third group, the fourth group, and the Nth group similarly include a first tile and at least two tiles that are coupled in series with the first tile of the respective group. Each of the tiles within each of the groups includes a set of antenna elements coupled to a beamforming IC.

In one embodiment, the set of antenna elements of a tiles are located on a first side of a circuit board of the tile and the beamforming IC is located on a second side of the circuit board. Alternatively, the set of antenna elements and the beamforming IC can be located on a same side of the circuit board.

In one embodiment, the parallel feed lines are outputs of a power splitter network. The power splitter network can include multiple splitters. For example, one or more power splitter can be coupled to the first tile of each of the groups of series-fed tiles 706-714. In one embodiment, the first tile of the first group of series-fed tiles 706 is coupled to a parallel feed line that is output from a first power splitter. The first tile of the second group of series-fed tiles 708 is also coupled to a parallel feed line that is output from the first power splitter. In another embodiment, the first tile of the second group of series-fed tiles 708 is coupled to a parallel feed line that is output from a second power splitter.

Figure 8:
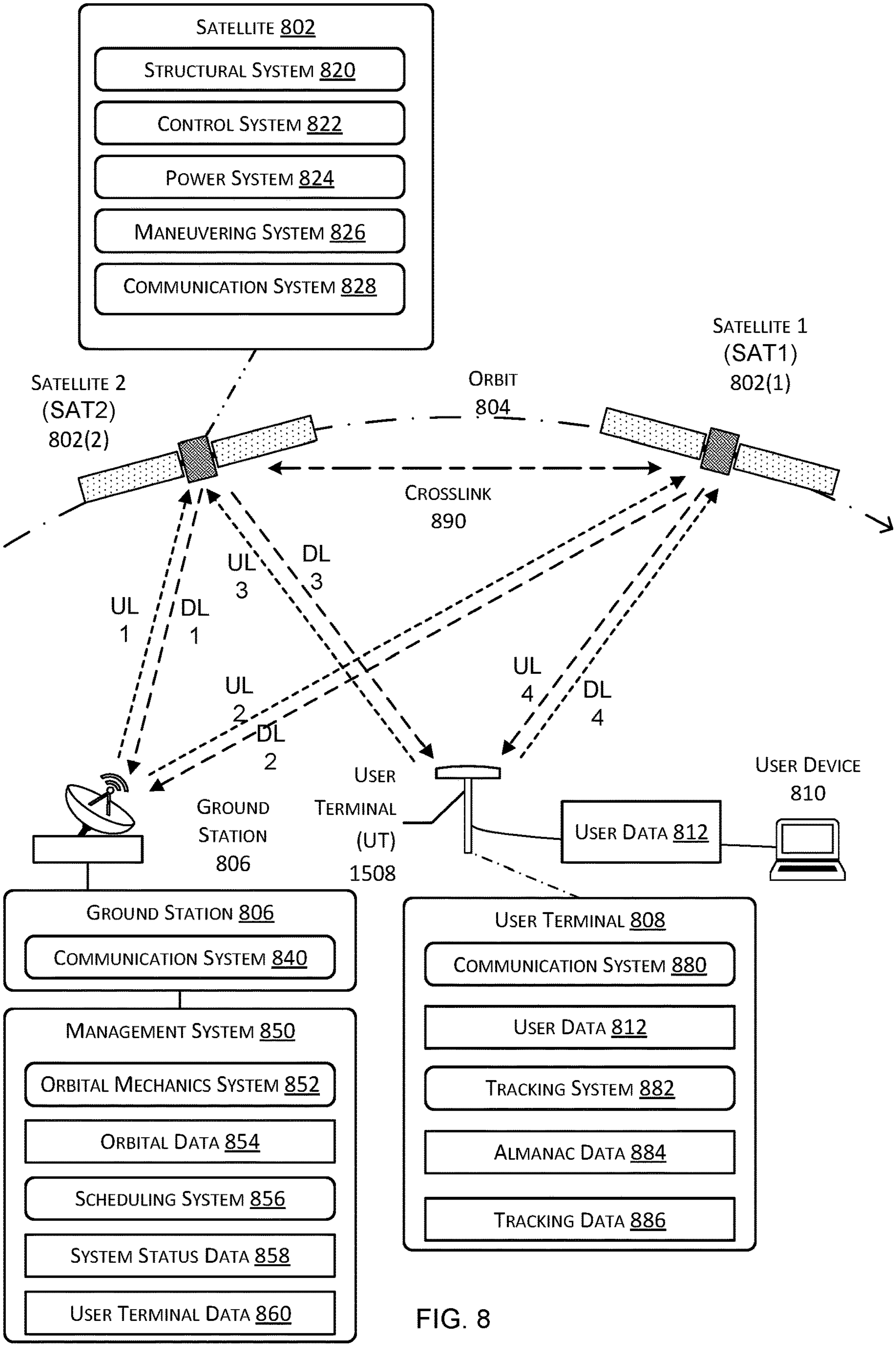
FIG. 8. illustrates a system including a constellation of satellites, each satellite being in orbit according to one embodiment.

FIG. 8 illustrates a system 800 including a constellation of satellites 802(1), 802(2), . . . 802(S), each satellite 802 being in orbit 804 according to one embodiment. The system 800 shown here comprises a plurality (or "constellation") of satellites 802(1), 802(2), . . . , 802(S), each satellite 802 being in orbit 804. Any of the satellites 802 can include the panel 100 of FIG. 1 or the various panels described herein. Also shown is a ground station 806, user terminal (UT) 808, and a user device 810.

The constellation may comprise hundreds or thousands of satellites 802, in various orbits 804. For example, one or more of these satellites 802 may be in non-geosynchronous orbits (NGOs) in which they are in constant motion with respect to the Earth. For example, the orbit 804 is a low earth orbit (LEO). In this illustration, orbit 804 is depicted with an arc pointed to the right. A first satellite (SAT 1) 802(1) is leading (ahead of) a second satellite (SAT2) 802(2) in the orbit 804.

The satellite 802 may comprise a structural system 820, a control system 822, a power system 824, a maneuvering system 826, and a communication system 828 described herein. In other implementations, some systems may be omitted or other systems added. One or more of these systems may be communicatively coupled with one another in various combinations.

The structural system 820 comprises one or more structural elements to support operation of the satellite 802. For example, the structural system 820 may include trusses, struts, panels, and so forth. The components of other systems may be affixed to, or housed by, the structural system 820. For example, the structural system 820 may provide mechanical mounting and support for solar panels in the power system 824. The structural system 820 may also provide for thermal control to maintain components of the satellite 802 within operational temperature ranges. For example, the structural system 820 may include louvers, heat sinks, radiators, and so forth.

The control system 822 provides various services, such as operating the onboard systems, resource management, providing telemetry, processing commands, and so forth. For example, the control system 822 may direct operation of the communication system 828.

The power system 824 provides electrical power for operation of the components onboard the satellite 802. The power system 824 may include components to generate electrical energy. For example, the power system 824 may comprise one or more photovoltaic cells, thermoelectric devices, fuel cells, and so forth. The power system 824 may include components to store electrical energy. For example, the power system 824 may comprise one or more batteries, fuel cells, and so forth.

The maneuvering system 826 maintains the satellite 802 in one or more of a specified orientation or orbit 804. For example, the maneuvering system 826 may stabilize the satellite 802 with respect to one or more axis. In another example, the maneuvering system 826 may move the satellite 802 to a specified orbit 804. The maneuvering system 826 may include one or more computing devices, sensors, thrusters, momentum wheels, solar sails, drag devices, and so forth. For example, the sensors of the maneuvering system 826 may include one or more global navigation satellite system (GNSS) receivers, such as global positioning system (GPS) receivers, to provide information about the position and orientation of the satellite 802 relative to Earth. In another example, the sensors of the maneuvering system 826 may include one or more star trackers, horizon detectors, and so forth. The thrusters may include, but are not limited to, cold gas thrusters, hypergolic thrusters, solid-fuel thrusters, ion thrusters, arcjet thrusters, electrothermal thrusters, and so forth.

The communication system 828 provides communication with one or more other devices, such as other satellites 802, ground stations 806, user terminals 808, and so forth. The communication system 828 may include one or more modems, digital signal processors, power amplifiers, antennas (including at least one antenna that implements multiple antenna elements, such as a phased array antenna, and including an embedded calibration antenna, such as the panels as described herein), processors, memories, storage devices, communications peripherals, interface buses, and so forth. Such components support communications with other satellites 802, ground stations 806, user terminals 808, and so forth using radio frequencies within a desired frequency spectrum. The communications may involve multiplexing, encoding, and compressing data to be transmitted, modulating the data to a desired radio frequency, and amplifying it for transmission. The communications may also involve demodulating received signals and performing any necessary de-multiplexing, decoding, decompressing, error correction, and formatting of the signals. Data decoded by the communication system 828 may be output to other systems, such as to the control system 822, for further processing. Output from a system, such as the control system 822, may be provided to the communication system 828 for transmission.

One or more ground stations 806 are in communication with one or more satellites 802. The ground stations 806 may pass data between the satellites 802, a management system 850, networks such as the Internet, and so forth. The ground stations 806 may be emplaced on land, on vehicles, at sea, and so forth. Each ground station 806 may comprise a communication system 840. Each ground station 806 may use the communication system 840 to establish communication with one or more satellites 802, other ground stations 806, and so forth. The ground station 806 may also be connected to one or more communication networks. For example, the ground station 806 may connect to a terrestrial fiber optic communication network. The ground station 806 may act as a network gateway, passing user data 812 or other data between the one or more communication networks and the satellites 802. Such data may be processed by the ground station 806 and communicated via the communication system 840. The communication system 840 of a ground station may include components similar to those of the communication system 828 of a satellite 802 and may perform similar communication functionalities. For example, the communication system 840 may include one or more modems, digital signal processors, power amplifiers, antennas (including at least one antenna that implements multiple antenna elements, such as a phased array antenna), processors, memories, storage devices, communications peripherals, interface buses, and so forth.

The ground stations 806 are in communication with a management system 850. The management system 850 is also in communication, via the ground stations 806, with the satellites 802 and the UTs 808. The management system 850 coordinates operation of the satellites 802, ground stations 806, UTs 808, and other resources of the system 800. The management system 850 may comprise one or more of an orbital mechanics system 852 or a scheduling system 856.

The orbital mechanics system 852 determines orbital data 854 that is indicative of a state of a particular satellite 802 at a specified time. In one implementation, the orbital mechanics system 852 may use orbital elements that represent characteristics of the orbit 804 of the satellites 802 in the constellation to determine the orbital data 854 that predicts location, velocity, and so forth of particular satellites 802 at particular times or time intervals. For example, the orbital mechanics system 852 may use data obtained from actual observations from tracking stations, data from the satellites 802, scheduled maneuvers, and so forth to determine the orbital elements. The orbital mechanics system 852 may also consider other data, such as space weather, collision mitigation, orbital elements of known debris, and so forth.

The scheduling system 856 schedules resources to provide communication to the UTs 808. For example, the scheduling system 856 may determine handover data that indicates when communication is to be transferred from the first satellite 802(1) to the second satellite 802(2). Continuing the example, the scheduling system 856 may also specify communication parameters such as frequency, timeslot, and so forth. During operation, the scheduling system 856 may use information such as the orbital data 854, system status data 858, user terminal data 860, and so forth.

The system status data 858 may comprise information such as which UTs 808 are currently transferring data, satellite availability, current satellites 802 in use by respective UTs 808, capacity available at particular ground stations 806, and so forth. For example, the satellite availability may comprise information indicative of satellites 802 that are available to provide communication service or those satellites 802 that are unavailable for communication service. Continuing the example, a satellite 802 may be unavailable due to malfunction, previous tasking, maneuvering, and so forth. The system status data 858 may be indicative of past status, predictions of future status, and so forth. For example, the system status data 858 may include information such as projected data traffic for a specified interval of time based on previous transfers of user data 812. In another example, the system status data 858 may be indicative of future status, such as a satellite 802 being unavailable to provide communication service due to scheduled maneuvering, scheduled maintenance, scheduled decommissioning, and so forth.

The user terminal data 860 may comprise information such a location of a particular UT 808. The user terminal data 860 may also include other information such as a priority assigned to user data 812 associated with that UT 808, information about the communication capabilities of that particular UT 808, and so forth. For example, a particular UT 808 in use by a business may be assigned a higher priority relative to a UT 808 operated in a residential setting. Over time, different versions of UTs 808 may be deployed, having different communication capabilities such as being able to operate at particular frequencies, supporting different signal encoding schemes, having different antenna configurations, and so forth.

The UT 808 includes a communication system 880 to establish communication with one or more satellites 802. The communication system 880 of the UT 808 may include components similar to those of the communication system 828 of a satellite 802 and may perform similar communication functionalities. For example, the communication system 880 may include one or more modems, digital signal processors, power amplifiers, antennas (including at least one antenna that implements multiple antenna elements, such as a phased array antenna), processors, memories, storage devices, communications peripherals, interface buses, and so forth. The UT 808 passes user data 812 between the constellation of satellites 802 and the user device 810. The user data 812 includes data originated by the user device 810 or addressed to the user device 810. The UT 808 may be fixed or in motion. For example, the UT 808 may be used at a residence, or on a vehicle such as a car, boat, aerostat, drone, airplane, and so forth.

The UT 808 includes a tracking system 882. The tracking system 882 uses almanac data 884 to determine tracking data 886. The almanac data 884 provides information indicative of orbital elements of the orbit 804 of one or more satellites 802. For example, the almanac data 884 may comprise orbital elements such as "two-line element" data for the satellites 802 in the constellation that are broadcast or otherwise sent to the UTs 808 using the communication system 880.

The tracking system 882 may use the current location of the UT 808 and the almanac data 884 to determine the tracking data 886 for the satellite 802. For example, based on the current location of the UT 808 and the predicted position and movement of the satellites 802, the tracking system 882 is able to calculate the tracking data 886. The tracking data 886 may include information indicative of azimuth, elevation, distance to the second satellite, time of flight correction, or other information at a specified time. The determination of the tracking data 886 may be ongoing. For example, the first UT 808 may determine tracking data 886 every 400 ms, every second, every five seconds, or at other intervals.

With regard to FIG. 8, an uplink is a communication link which allows data to be sent to a satellite 802 from a ground station 806, UT 808, or device other than another satellite 802. Uplinks are designated as UL1, UL2, UL3 and so forth. For example, UL1 is a first uplink from the ground station 806 to the second satellite 802(2). In comparison, a downlink is a communication link which allows data to be sent from the satellite 802 to a ground station 806, UT 808, or device other than another satellite 802. For example, DL1 is a first downlink from the second satellite 802(2) to the ground station 806. The satellites 802 may also be in communication with one another. For example, a crosslink 890 provides for communication between satellites 802 in the constellation.

The satellite 802, the ground station 806, the user terminal 808, the user device 810, the management system 850, or other systems described herein may include one or more computer devices or computer systems comprising one or more hardware processors, computer-readable storage media, and so forth. For example, the hardware processors may include application specific integrated circuits (ASICs), field-programmable gate arrays (FPGAs), microcontrollers, digital signal processors (DSPs), and so forth. The computer-readable storage media can include system memory, which may correspond to any combination of volatile and/or non-volatile memory or storage technologies. The system memory can store information that provides an operating system, various program modules, program data, and/or other software or firmware components. In one embodiment, the system memory stores instructions of methods to control operation of the electronic device. The electronic device performs functions by using the processor(s) to execute instructions provided by the system memory. Embodiments may be provided as a software program or computer program including a non-transitory computer-readable storage medium having stored thereon instructions (in compressed or uncompressed form) that may be used to program a computer (or other electronic device) to perform the processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Figure 9:
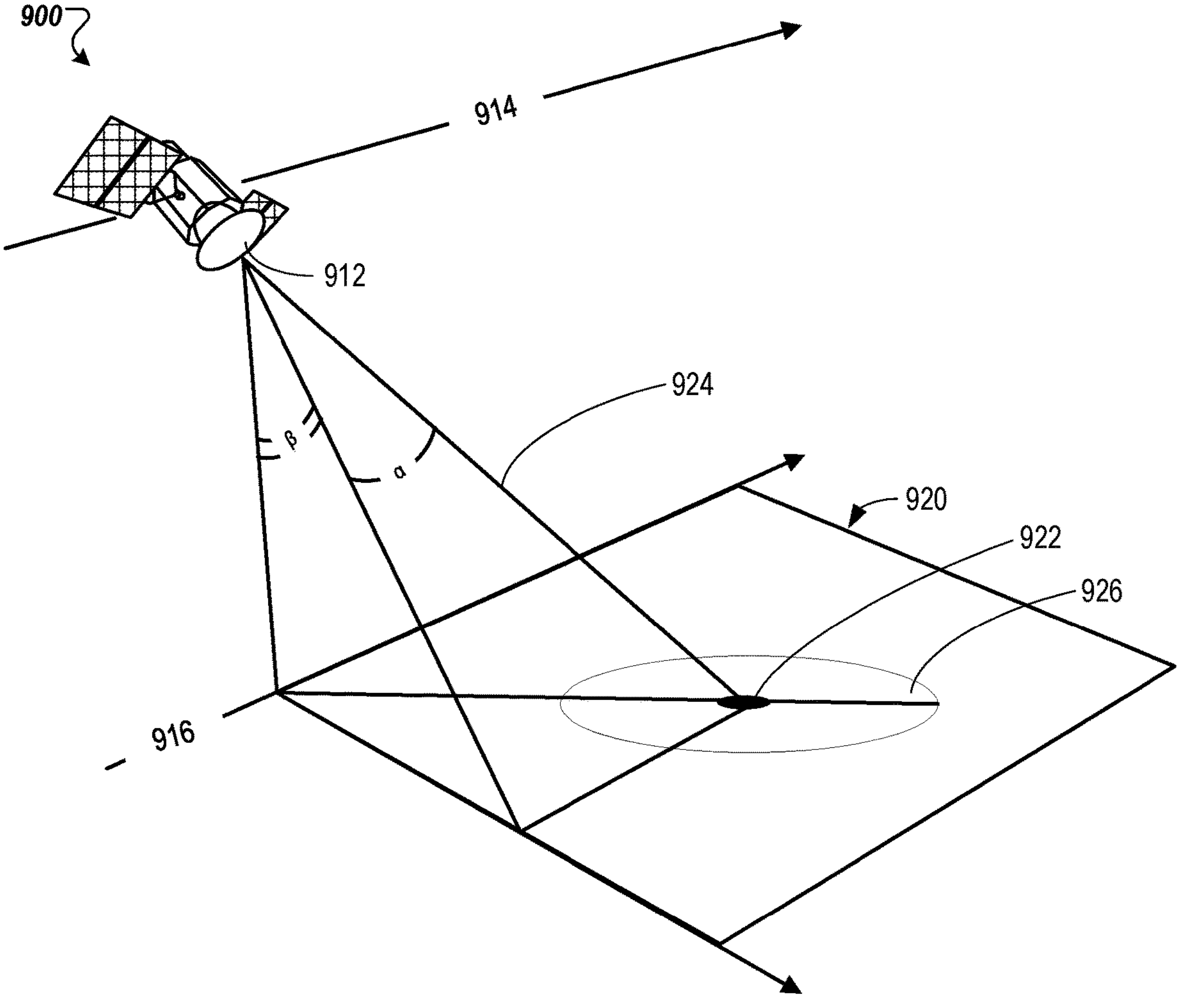
FIG. 9 illustrates the satellite including an antenna system that is steerable according to one embodiment.

FIG. 9 illustrates the satellite 900 including an antenna system 912 that is steerable according to one embodiment. The satellite 900 can include the communication system 828 of FIG. 8. The antenna system 912 may include multiple antenna elements that form an antenna and that can be mechanically or electrically steered individually, collectively, or a combination thereof. In an example, the antenna is a phased array antenna.

In orbit 804, the satellite 900 follows a path 914, the projection of which onto the surface of the Earth forms a ground path 916. In the example illustrated in FIG. 9, the ground path 916 and a projected axis extending orthogonally from the ground path 916 at the position of the satellite 900, together define a region 920 of the surface of the Earth. In this example, the satellite 900 is capable of establishing uplink and downlink communications with one or more of ground stations, user terminals, or other devices within the region 920, including a ground station 806 and a user terminal 808 of FIG. 8. In some embodiments, the region 920 may be located in a different relative position to the ground path 916 and the position of the satellite 900. For example, the region 920 may describe a region of the surface of the Earth directly below the satellite 900. Furthermore, embodiments may include communications between the satellite 900, an airborne communications system, and so forth.

As shown in FIG. 9, a communication target 922 (e.g., a ground station, a user terminal, or a CT (such as an HD CT)) is located within the region 920. The satellite 900 controls the antenna system 912 to steer transmission and reception of communications signals to selectively communicate with the communication target 922. For example, in a downlink transmission from the satellite 900 to the communication target 922, a signal beam 924 emitted by the antenna system 912 is steerable within an area 926 of the region 920. In some implementations, the signal beam 924 may comprise a plurality of subbeams. The extents of the area 926 define an angular range within which the signal beam 924 is steerable, where the direction of the signal beam 924 is described by a beam angle "α" relative to a surface normal vector of the antenna system 912. In two-dimensional phased array antennas, the signal beam 924 is steerable in two dimensions, described in FIG. 9 by a second angle "β" orthogonal to the beam angle α. In this way, the area 926 is a two-dimensional area within the region 920, rather than a linear track at a fixed angle determined by the orientation of the antenna system 912 relative to the ground path 916.

In FIG. 9, as the satellite 900 follows the path 914, the area 926 tracks along the surface of the Earth. In this way, the communication target 922, which is shown centered in the area 926 for clarity, is within the angular range of the antenna system 912 for a period of time. During that time, signals communicated between the satellite 900 and the communication target 922 are subject to bandwidth constraints, including but not limited to signal strength and calibration of the signal beam 924. In an example, for phased array antenna systems, the signal beam 924 is generated by an array of mutually coupled antenna elements, wherein constructive and destructive interference produce a directional beam. Among other factors, phase drift, amplitude drift (e.g., of a transmitted signal in a transmitter array), and so forth affect the interference properties and thus the resultant directional beam or subbeam.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to convey the substance of their work most effectively to others skilled in the art. An algorithm is used herein, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining," "sending," "receiving," "scheduling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, Read-Only Memories (ROMs), compact disc ROMs (CD-ROMs) and magnetic-optical disks, Random Access Memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A communication system comprising:

a modem; and a feed port coupled to the modem;

a plurality of parallel feed lines coupled to the feed port; and a plurality of groups of tiles, each of the plurality of groups of tiles being coupled to one of the plurality of parallel feed lines, wherein the plurality of groups of tiles comprises:

a first group comprising i) a first tile coupled to a first feed line of the plurality of parallel feed lines, ii) a second tile that is coupled in series with the first tile of the first group, and iii) a third tile that is coupled in series with the first tile of the first group, wherein the second tile and the third tile of the first group are coupled in parallel with each other; and a second group comprising iv) a first tile coupled to a second feed line of the plurality of parallel feed lines, v) a second tile that is coupled in series with the first tile of the second group, and vi) a third tile coupled in series with the first tile of the second group, wherein the second tile and the third tile of the second group are coupled in parallel with each other, wherein each tile of the plurality of groups of tiles comprises a set of antenna elements coupled to a beamforming integrated circuit (IC).

2. The communication system of claim 1, wherein the set of antenna elements are located on a first side of a circuit board and the beamforming IC is located on a second side of the circuit board.

3. The communication system of claim 1, further comprising a plurality of power splitters, wherein a first power splitter of the plurality of power splitters is coupled to i) the first tile of the first group via the first feed line and ii) to the first tile of the second group via the second feed line.

4. The communication system of claim 1, further comprising:

a first power splitter coupled to the first tile of the first group via the first feed line; and a second power splitter coupled to the first tile of the second group via the second feed line.

5. The communication system of claim 4, wherein the first feed line and the second feed line are equal in length.

6. The communication system of claim 1, wherein the first group further comprises:

a fourth tile that is coupled in series with the second tile of the first group;

a fifth tile that is coupled in series with the second tile of the first group; and a sixth tile that is coupled in series with the fourth tile of the first group.

7. The communication system of claim 1, wherein the first group further comprises:

a first set of tiles located on a first axis, the first set comprising at least the first tile of the first group and the second tile of the first group; and a second set of tiles located on a second axis parallel to the first axis, the second set comprising at least the third tile of the first group.

8. The communication system of claim 1, wherein the first tile of the first group comprises a first beamforming integrated circuit (IC) and a first set of antenna elements, the first beamforming IC comprising an input terminal coupled to a first power splitter via the first feed line, wherein each of the first set of antenna elements is coupled to the first beamforming IC via a third feed line.

9. The communication system of claim 8, wherein the second tile of the first group comprises a second beamforming IC having an input terminal coupled to a first output terminal of the first beamforming IC.

10. The communication system of claim 9, wherein the third tile of the first group comprising a third beamforming IC having an input terminal coupled to a second output terminal of the first beamforming IC.

11. The communication system of claim 9, further comprising a fourth tile of the first group, the fourth tile comprising a fourth beamforming IC having an input terminal coupled to a first output terminal of the second beamforming IC.

12. A panel of an array antenna, the panel comprising:

a circuit board comprising a modem, a feed port coupled to the modem, and a plurality of parallel feed lines coupled to the feed port;

a plurality of groups of tiles, each of the plurality of groups of tiles being coupled to a first feed line of the plurality of parallel feed lines, wherein the plurality of groups of tiles comprises:

a first group comprising i) a first tile coupled to the first feed line, ii) a second tile that is coupled in series with the first tile of the first group, and iii) a third tile that is coupled in series with the first tile of the first group, wherein the second tile and the third tile of the first group are coupled in parallel with each other; and a second group comprising iv) a first tile coupled to a second feed line of the plurality of parallel feed lines, v) a second tile that is coupled in series with the first tile of the second group, and vi) a third tile coupled in series with the first tile of the second group, wherein the second tile and the third tile of the second group are in parallel with each other, wherein each tile of the plurality of groups of tiles comprises a set of antenna elements coupled to a beamforming integrated circuit (IC).

13. The panel of claim 12, wherein the set of antenna elements are located on a first side of the circuit board and the beamforming IC is located on a second side of the circuit board.

14. The panel of claim 12, further comprising a plurality of power splitters, wherein a first power splitter of the plurality of power splitters is coupled to i) the first tile of the first group via the first feed line and ii) to the first tile of the second group via the second feed line.

15. The panel of claim 12, wherein the first group and the second group have a same number and placement of tiles.

16. A communication system comprising:

a modem; and a panel comprising:

a feed port coupled to the modem;

a first power splitter coupled to the feed port;

a set of power splitters, each coupled to the first power splitter via an equi-length line;

a plurality of parallel feed lines, each parallel feed line being coupled to one power splitter of the set of power splitters; and a plurality of groups of tiles, each of the plurality of groups of tiles being coupled to a first feed line of the plurality of parallel feed lines, wherein the plurality of groups of tiles comprises:

a first group comprising i) a first tile coupled to the first feed line, ii) a second tile that is coupled in series with the first tile of the first group, and iii) a third tile that is coupled in series with the first tile of the first group, wherein the second tile and the third tile of the first group are coupled in parallel with each other; and a second group comprising iv) a first tile coupled to a second feed line of the plurality of parallel feed lines, v) a second tile that is coupled in series with the first tile of the second group, and vi) a third tile coupled in series with the first tile of the second group, wherein the second tile and the third tile of the second group are coupled in parallel with each other, wherein each tile of the plurality of groups of tiles comprises a set of antenna elements coupled to a beamforming integrated circuit (IC).

17. The communication system of claim 16, wherein the set of antenna elements are located on a first side of a circuit board and the beamforming IC is located on a second side of the circuit board.

18. The communication system of claim 16, further comprising:

a first power splitter of the set of power splitters coupled to the first tile of the first group via the first feed line; and a second power splitter of the set of power splitters coupled to the first tile of the second group via the second feed line of the plurality of parallel feed lines, wherein the first feed line and the second feed line are equal in length.

19. The communication system of claim 6, wherein a first layout of the first group is identical to a second layer of the second group.

20. The communication system of claim 1, further comprising a power splitter coupled to four groups of tiles comprising the first group and the second group.

* * * * *